United States Patent [19]

Bailey

[11] Patent Number: 4,457,839
[45] Date of Patent: Jul. 3, 1984

[54] VIBRATORY SCREENING APPARATUS

[75] Inventor: Marshall G. Bailey, Banchory, Scotland

[73] Assignee: Thule United Limited, Scotland

[21] Appl. No.: 305,717

[22] Filed: Sep. 25, 1981

[30] Foreign Application Priority Data

Oct. 20, 1980 [GB] United Kingdom ............... 8033714

[51] Int. Cl.$^3$ .............................................. B07B 9/00
[52] U.S. Cl. .................. 209/234; 209/333; 209/403; 209/341; 55/504; 210/388
[58] Field of Search .................. 55/504; 210/388, 407; 209/311, 315, 341, 314, 316, 319, 269, 405, 408, 409, 403, 234, 333

[56] References Cited

U.S. PATENT DOCUMENTS

| 1,179,842 | 4/1916 | Kirksey | 209/408 |
| 2,511,239 | 6/1950 | Behnke et al. | 209/403 |
| 3,485,364 | 12/1969 | Burrough | 209/315 |
| 3,666,095 | 5/1972 | Krynock et al. | 209/314 |
| 3,788,046 | 1/1974 | Kaeppler et al. | 53/490 |
| 4,237,000 | 12/1980 | Read et al. | 209/319 |

FOREIGN PATENT DOCUMENTS

| 489210 | 7/1938 | United Kingdom | 209/269 |
| 724225 | 3/1980 | U.S.S.R. | 209/403 |

*Primary Examiner*—Bernard Nozick
*Attorney, Agent, or Firm*—Nelson E. Kimmelman

[57] ABSTRACT

Vibratory screening apparatus wherein a filtrating cradle incorporating screens is vibrated on a machine base, and wherein a bottom screen (56) in said cradle (12) can be withdrawn between an upper support (64) on said cradle and an intermediate support (54) on a bottom screen frame (52), which frame is also withdrawable from the machine on a lower support (62) on the cradle, hydraulic expander means (60) being provided to act on the lower support so that, in the inserted position of the bottom screen frame, the opposed sides of the bottom screen can be clamped between the upper and intermediate supports, locking the bottom screen and its support in position.

19 Claims, 3 Drawing Figures

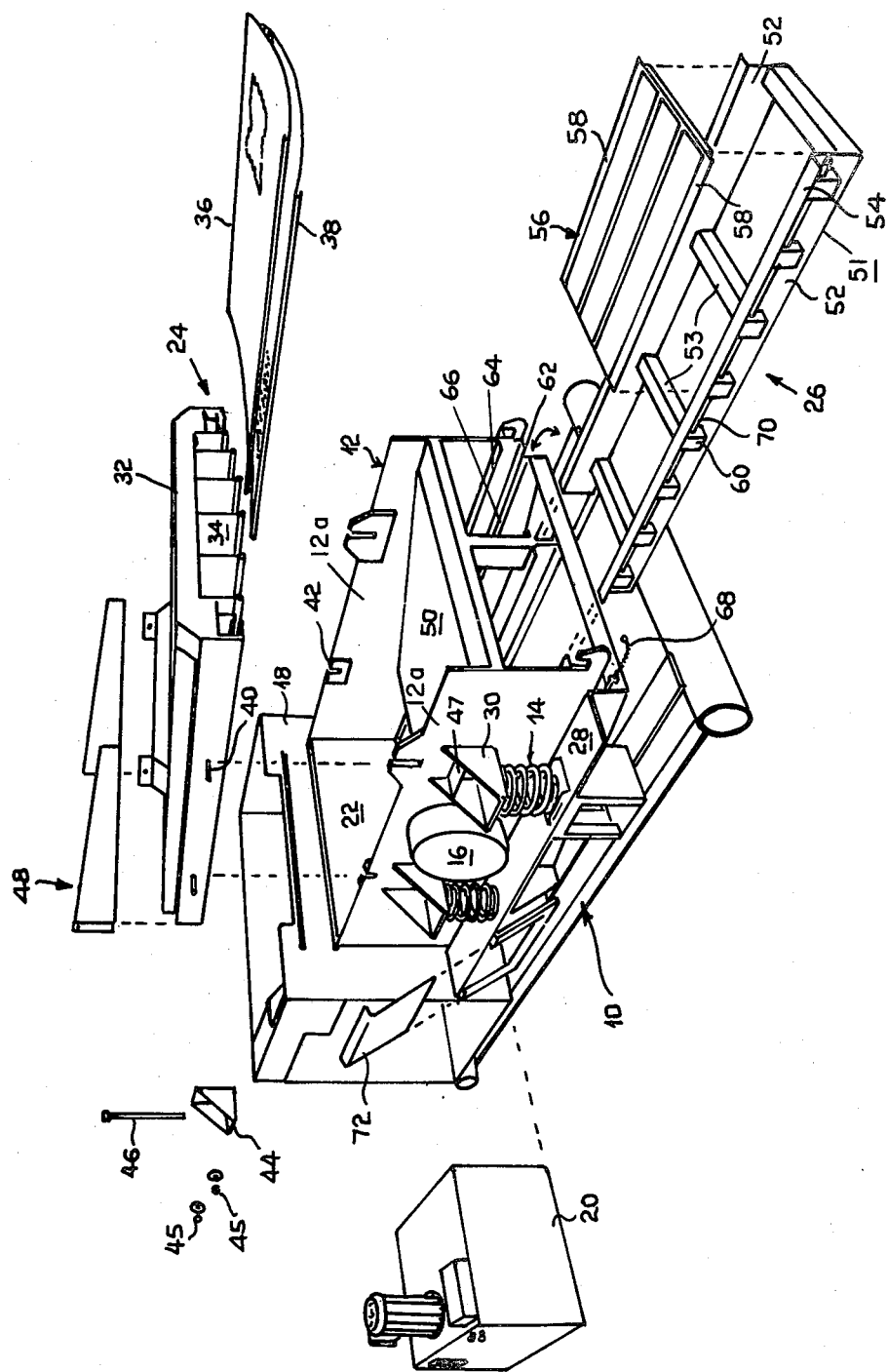

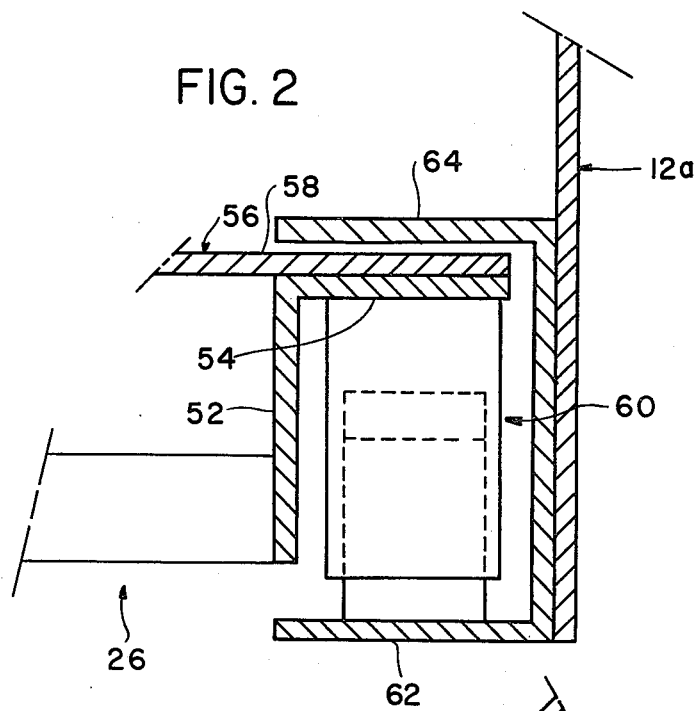
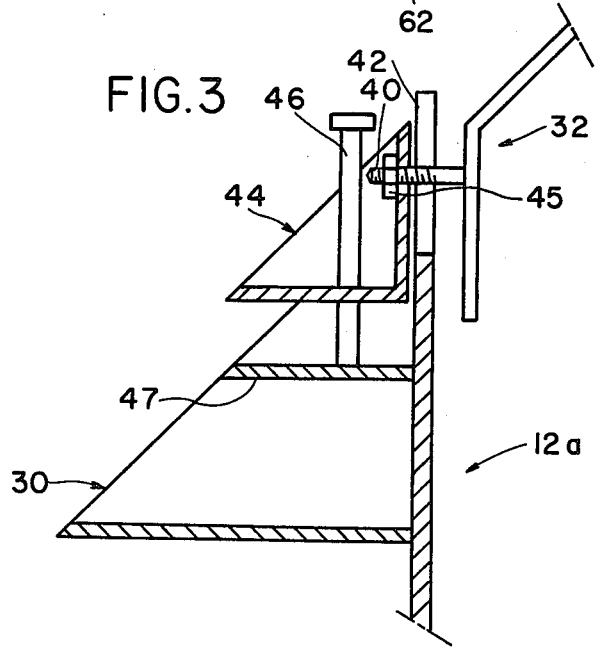

VIBRATORY SCREENING APPARATUS

DESCRIPTION

1. Field of the Invention

This invention relates to vibratory screening apparatus in which a product to be filtered is vibrated on a screen.

2. Background to the Invention

A suspension/solution of certain clays and other additives is used as a mud for drilling. The functions of the mud are to act as a lubricant, a sealant to maintain hole pressure, a coolant for the drill, and a hydraulic carrier of cuttings from the bottom of the hole to the surface. Because of the additives, the mud is normally reclaimed and after reconditioning is recirculated.

Reclamation has been achieved by removing the drilling cuttings by settlement but current practice is to remove the large cuttings through a coarse mesh (on a shale shaker). The resulting mud containing fine cuttings has then been pumped through hydrocyclones which separate most of the mud from the sand and silt. The removal of the last of the mud from the sand and silt (approx 5%) has been achieved by passing it through a fine mesh screen. Thus the hydrocyclones handle 100% of the mud (excluding large solids) but only approximately 5% goes to the fine screen.

Hydrocycloning has been found to break up the particles which are to be filtered due to the high shear that occurs in a hydrocyclone. The result is that the particles which are to be filtered may well be broken down to particle sizes equal to that of the mud particles and the result is that there is a minimum size below which particles cannot be removed from the mud. These minute particles equivalent to the size of the mud particles tend to accumulate in the mud until eventually the mud becomes totally unusable since the contaminating particles cannot be separated from the mud particles by filtration. Clearly therefore it would be an advantage not to employ hydrocycloning since simple filtration does not break up the contaminating particles into the mud sized particles and 100% filtration can be achieved.

Clearly if hydrocycloning is to be avoided, the whole of the liquid flow must pass through the fine screen. In order to handle the total flow a fine screen would have to be of a very large area and further problems arise due to the fact that the fine screen tends to be fragile. These problems are discussed in British Patent Specification No. 1326133 reference to which is made for a description of a conventional vibratory screening machine consisting of a vibrating basket inside of which is mounted a woven mesh screen. This patent specification describes the use of hookstrips for tensioning fine mesh screen. Alternatively this screen may be tensioned during manufacture and glued to a frame ready for quick assembly into the vibrating basket.

The motion of the basket may be linear, elliptical or circular and the mud/solids are fed onto one end of the screen (typically the rear end). The vibration of the screen causes the solids which settle onto the screen to be thrown up and along towards the opposite end of the screen (i.e. the front). The vibration of the screen serves two purposes:

1. It prevents the solids from accumulating on the screen and blocking the mesh.

2. It conveys the solids to the front of the screen where they can be collected and typically fall off to facilitate disposal.

Typically therefore the basket is open at the front end to permit the overflow of solids from the screen.

The maximum capacity of a conventional screen constructed along these lines is usually regarded as being when two-thirds of the screen is covered with mud. The remaining third "dries" the solids. The capacity of such a screen can be increased by increasing the frequency and/or the amplitude of the vibration since this effectively increases the acceleration of the particles and forces more liquid through the mesh. Maximum amplitudes and frequencies are limited by basket design and construction.

Conventional screens are mounted either horizontally or sloped downwards towards the front where the particles leave the screen, since this improves the conveying of the particles.

The present invention is concerned with vibrating screening apparatus which is especially useful in the field of oil well drilling, but is also of more general applicability. Thus the term "product" as used in this specification and the appended claims is to be broadly interpreted.

THE INVENTION

According to the invention, there is provided vibratory screening apparatus in which a product to be filtered is vibrated on a screen, comprising upper and lower supports between which opposed sides of the screen are supported, expander means on at least one side of the screen for effecting relative displacement of the upper and lower supports into clamping engagement with the screen, whereby the screen is slideable into and out of the apparatus when the expander means is released, and a carriage or screen fram for the expander means which is also slideable into and out of the apparatus when the expander means is released.

The upper and lower supports may conveniently comprise upper and lower rails between which lateral flanges on the opposed sides of the screen are supported.

The rails may both be carried by a box or cradle which is driveable by a vibrator, for example with the upper (or lower) rails fixedly mounted and the lower (or upper) rails movably mounted, the carriage being slideable on the fixed rails and the expander means acting on the movable rails. Preferably, however, the carriage carries the lower rails or, more generally, the lower supports. Thus, in a preferred arrangement, a vibratory cradle is provided carrying on each side a top rail and a bottom rail and a carriage or screen frame carrying on each side an intermediate rail, the top rails on the cradle and the intermediate rails on the carriage respectively constituting said upper and lower rails.

In this preferred arrangement, when the carriage or screen frame is inserted into the apparatus the expander means is adapted to act on at least one bottom rail to urge the carriage or screen frame carrying the lower rail upwardly towards the upper rail. It is alternatively possible for the lower rails to be movably mounted on the carriage or screen frame.

The expander means preferably comprises a plurality of hydraulic actuators slideable on the bottom rail. Alternatively the expander means may be mechanically actuated, e.g. to displace the movable supports through eccentrics mounted on rotatable rods, or may be electrically operated, or pneumatic.

An hydraulic drive is generally to be preferred because, in the preferred arrangement, the vibratory cradle is resiliently mounted on a base and adapted to be vibrated relative to said base by means of an hydraulic motor. The said screen may conveniently constitute a bottom screen receiving a partially filtered product from a top screen mounted at the top of the vibratory cradle.

IN THE ACCOMPANYING DRAWING

FIG. 1 shows a preferred example of vibratory screening apparatus in accordance with the invention in dis-assembled perspective view.

FIG. 2 is a fragmentary cross-sectional view showing a carriage in sliding engagement with a cradle; and FIG. 3 is a fragmentary cross-sectional view showing two cooperating brackets.

DESCRIPTION OF EMBODIMENT

The apparatus shown in the drawing comprises a machine base 10 on which a screen-carrying cradle, generally designated 12, can be vibrated. Thus, the cradle 12 is mounted to the base 10 through heavy duty coil springs 14, two on each side, to be shaken by a rotating off-centre mass (not shown) driven by an hydraulic motor. The cross-shaft housing for the hydraulic motor is designated 16. At its rear end, the base 10 carries a housing 18 for distribution of the mud onto the screen and to house a power unit 20 for the machine hydraulics (not shown).

The cradle 12 having opposed side walls 12a and 12b comprises a box frame 22, a top screen assembly 24 which rests on box frame 22 and a bottom screen assembly 26 slidable into or out of the cradle 12. The springs 14 are located between side platforms 28 forming part of the base 10 and suspension brackets 30 on the exterior of the side walls of the box frame.

The top screen assembly 24 comprises a frame 32 having depending ribs 34, across which are independently tensioned a broad mesh upper sieve member 36 and a narrower mesh lower sieve member 38. The frame 32 has pairs of side pins 40 received in vertical slots 42 in the upper edges of the side walls of the box frame 22, thereby to locate the top screen assembly in position to the top of said box frame.

The top screen assembly 24 is screwed in its located position by nuts 45, 45A tightened onto side pins 40, 40A which are received in the respective slots 42 in the side walls of frame 22. By releasing the nuts, upper screen assembly 24 can be lifted upwardly and, if required, detached for cleaning and servicing.

In the case of nuts 45 and pins 40, intermediate jacking brackets 44 are screwed on opposite sides of the screen assembly 24 over the forward side pins 40. As also shown in FIG. 3, threaded bolts 46 are engaged in screw-threaded holes in bases of the brackets 44 and when in position bear against bridging plates 47 in the suspension brackets 30. Turning the 46 to produce downward movement thereof, when at least the nut 45 has been partially loosened, will therefore lift the forward end of the top screen assembly 24.

Lifting the forward end of the screen 24 relative to the rear end produces the inclination required to retain the cuttings on the screen for a longer period of time so as to recover as much liquid adhering thereto as possible.

An inlet chute 48 for a product to be filtered fits to the top of the housing 18 at the rear of the machine.

In use, the vibrating action is such that the product to be filtered is shaken forwardly on the top screen assembly 24 so that solid foreign matter is discharged to waste at the front end. Liquid product, with a residue of small particle foreign matter, is filtered through the sieve members 36, 38 to drop into the interior of the box frame 22. During filtering, the broad mesh upper sieve member 36 flaps against the narrower mesh lower sieve member 38 to assist in keeping the latter from plugging and in turn helps to keep both screens clean. At an intermediate level in the box frame 22 is fixed a sloping tray 50. This tray receives the filtrate from the top screen assembly 24, and diverts it rearwardly so that it falls onto the rear (input) end of the bottom screen assembly 26.

The present invention is concerned with this bottom screen assembly 26, which comprises a supporting frame generally shown at numeral 51 and side members 52 in the form of angle elements with flanges constituting rails 54. The side members 52 are interconnected by spaced cross-members 53. The lower screen assembly also includes a pair of lower screen members (of which one 56 is shown) having lateral flanges 58 resting on the rails 54. Attached to the lower surface of each side rail 54 is a series of hydraulic actuators 60. The frame 51 is receivable (from a front withdrawn position) rearwardly into the machine, the lower ends of actuators 60 sliding on the top surfaces of a pair of bottom rails 62 provided on the interior of the side walls of the box frame 22. Above the bottom rails 62, the box frame 22 is provided with a corresponding pair of top rails 64. The lateral flanges 58 on the bottom screen members 56, which rest on the side rails 54 of the lower screen frame 51, pass with small clearance beneath the top rails 64 when the bottom screen assembly is being inserted from the front into the machine or is being withdrawn forwardly as shown in FIG. 2. It is thus alternatively possible, when the bottom screen assembly 26 is located within the machine, to withdraw only the screen members 56, sliding them rearwardly out of the machine on the side rails 54 of the frame 51. When the lower screen frame 51 is located within the machine, an hydraulic fluid supply pipe 66 on the machine base 10 connects or is connectible, through a flexible or yielding connecting element 68, with a distribution pipe 70 connecting the hydraulic actuators 60 on said frame 51. When operated, the actuators operate, i.e., have their movable elements press downwardly, on the bottom rails 62 on the box frame 22 to urge the frame 51 upwardly, thereby pressing its side rails 54 into engagement with the top rails on the box frame 22 with the lateral flanges 58 on the screen members 56 sandwiched therebetween. Said screen members 56 are thereby clamped in position at their opposed side edges, and in the operated condition of the actuators 60 neither the bottom screen frame 51, nor the screen members 56 alone, can be withdrawn from the machine. During vibratory screening, the actuators 60 are maintained in their operated condition, and the hydraulics control box 20 may incorporate means for preventing vibration of the cradle 12 unless the bottom screen assembly 26 is locked in position.

The ability to withdraw the bottom screen members 56 alone is important to facilitate cleaning and replacement of the bottom screen without any major interruption in operation of the machine. The facility to withdraw the complete bottom screen frame 51, together with the expander means 60, is important for more major servicing and cleaning, not only of the bottom screen assembly but also of the inside of the machine base. In this connection the machine base 10 is provided with a withdrawable panel 72 to allow screened fluid which has been collected in base 10 to be channelled to a recirculatory point.

In use, filtrate falls from the intermediate level sloping tray 50 to be incident on the rear end of the bottom screen with a component of rearward movement, i.e. a component of movement opposite to the direction in which the product is moving on the bottom screen due to the vibrating action of the cradle 12. This improves the efficiency of operation of the lower screen, reducing any tendency for the product simply to slosh down onto the bottom screen with some liquid discharged to waste instead of being properly filtered. Filtered or screened liquid product passing through the bottom screen is discharged into the machine base 10 and thence through the ports normally covered by the panels 72 for recirculation. Residual foreign matter is discharged to waste (or possibly re-filtration) at the front end of the bottom screen.

As previously mentioned, the machine is especially useful for the recovery of the fluid used in oil well drilling and commonly referred to as "mud" which is returned to the surface of the bore in admixture with solid foreign matter during drilling.

Various modifications of the above-described arrangement are possible within the scope of the invention as defined by the appended claims. For example, the side rails on the bottom screen frame may be movably mounted thereon, so that the hydraulic actuators (which may be replaced by electrical or mechanical actuators) act only on said rails. Again, such lower clamping rails may be provided in the cradle, instead of forming part of the lower screen assembly.

In addition the invention may to advantage be applied to an upper screen of a multiple screen unit where the upper screen performs a primary screening operation and is mounted at the top of a vibrating cradle and is adapted to deliver partially filtered product to a lower screen.

I claim:
1. Vibratory screening apparatus comprising:
   a machine base;
   a cradle mounted on the base for vibratory movement relative thereto, said cradle having a lower pair of spaced, parallel rails for slidably receiving and supporting a screen assembly and an upper pair of spaced, parallel rails below which the screen assembly is supported with clearance;
   a motor means for vibrating the cradle; and
   a screen assembly comprising a frame slidable onto the lower rails of the cradle, said frame having a normal vertical depth to be received with clearance below the upper rails, said frame being expansible vertically, said screen assembly also including a screen normally supported by said frame and being slidable into and out of the frame, said frame also including expander means operable when the screen-supporting frame is inserted into and supported in the cradle to expand the frame vertically into a condition in which it is locked between the lower and upper rails of the cradle and simultaneously the screen is locked with respect to the frame.

2. Apparatus as claimed in claim 1 wherein the expander means is hydraulically actuated.
3. Apparatus as claimed in claim 1 wherein the frame carries the lower rails.
4. Apparatus as claimed in claim 3 wherein it is the upper and lower rails between which lateral flanges on the opposed sides of the screen assembly are supported.
5. Apparatus as claimed in claim 4 having a vibratory cradle carrying on each side a top rail and a bottom rail, wherein the frame carries on each side an intermediate rail, the top rails on the cradle and the intermediate rails on the frame respectively constituting said upper and lower rails.
6. Apparatus as claimed in claim 5 wherein when the frame is inserted into the cradle, the expander means is adapted to act on at least one bottom rail to urge the frame carrying the intermediate rail upwardly towards the top rail.
7. Apparatus as claimed in claim 4 wherein the expander means comprises a plurality of hydraulic actuators slideable on the bottom rails.
8. Apparatus as claimed in claim 4 wherein the vibratory cradle is resiliently mounted on a base and adapted to be vibrated relative to said base by means of a hydraulic motor.
9. Apparatus as claimed in claim 8 wherein the said screen constitutes a bottom screen receiving a partially filtered product from a top screen mounted at the top of the vibratory cardle.
10. Apparatus as claimed in claim 8 with the addition of a top screen assembly for performing a primary screening operation mounted at the top of the vibratory cradle and being adapted to deliver partially filtered product to a lower screen.
11. Vibratory screening apparatus comprising:
   (a) a cradle mounted for vibratory motion, said cradle including two pairs of fixed upper and lower spaced support means,
   (b) a screen having two opposing sides respectively adapted to be normally positioned between said upper and lower spaced support means, and
   (c) a bottom screen frame insertable into or withdrawable from said cradle and having two opposite side portions adapted to be positioned in operation below and supporting said opposing sides of said screen, said frame when inserted into said cradle being adapted in operation to rest on said lower support means, said screen frame having means connected to said two side portions for urging said side portions upward when said screen and frame are in operating position in said cradle, thereby to clamp said two opposing sides of said screen between said upper support means and the opposite side portions of said screen frame, said urging means also being constructed to let said side portions be lowered to permit sliding removal of said screen or said frame from said cradle.
12. The apparatus according to claim 11 wherein said upper and lower support means are rails, wherein said opposite side portions of said frame are rails and wherein said means for urging include expandable means fixed to the respective lower surfaces of said side portions of said frame with the lower ends of said urging means normally resting respectively on the upper surfaces of said lower rails.
13. Vibratory screening apparatus comprising:
   a machine base;

a cradle mounted on the base for vibratory movement relative thereto, said cradle having a lower pair of spaced, parallel rails for slidably receiving and supporting a screen assembly and an upper pair of spaced, parallel rails below which the screen assembly is supported with clearance; and a motor means for vibrating the cradle; said screen assembly comprising a frame normally slidable on the lower rails into and out of the cradle, said frame having a normal vertical depth to be received with clearance below the upper rails, said frame having expander means for enabling it to be expansible in the direction of the vertical depth of the frame, said screen assembly also including an associated screen normally slidable into and out of the frame, said expander means operable when the frame is supported in the cradle and simultaneously the screen is locked in the frame.

14. Apparatus as claimed in claim 13 wherein the expander means is hydraulically actuated.

15. Apparatus as claimed in claim 13 wherein the expander means comprises a plurality of hydraulic actuators slidable on the lower rails.

16. Apparatus as claimed in claim 13 wherein the vibratory cradle is resiliently mounted on a base and adapted to be vibrated relative to said base by means of a hydraulic motor.

17. Apparatus as claimed in claim 13 wherein the said withdrawable screen constitutes a bottom screen receiving a partially filtered product from a top screen mounted on top of the vibratory cradle.

18. Vibratory screening apparatus comprising:
(a) a cradle mounted for vibratory motion, said cradle including pairs of fixed upper and lower spaced support means on opposite sides of the cradle;
(b) a screen having two opposing sides, and
(c) a screen supporting frame having two opposite side portions which slidably support said opposing sides of said screen to allow its withdrawal from said frame, said screen frame having expander means which are slidably supported by said lower spaced support means to allow withdrawal of the support frame and screen thereon from the cradle, said expander means being connected to said two side portions for urging said side portions upward when said screen and frame are in the cradle, thereby both to clamp said upper support means and the opposite side portions of said screen frame and to lock said screen frame between said upper and lower spaced support means.

19. The apparatus according to claim 18 wherein said upper and lower support means are rails, wherein said opposite side portions of said frame are rails and wherein said expander means include expandable elements fixed to the respective lower surfaces of said side portions of said frame with the lower ends of said elements normally resting respectively on the upper surfaces of said lower support rails.

* * * * *